US008538377B2

(12) United States Patent
Colonna et al.

(10) Patent No.: US 8,538,377 B2
(45) Date of Patent: Sep. 17, 2013

(54) METHOD AND SYSTEM FOR DETERMINING ROAD TRAFFIC JAMS BASED ON INFORMATION DERIVED FROM A PLMN

(75) Inventors: Massimo Colonna, Turin (IT); Davide Micheli, Rome (IT)

(73) Assignee: Telecom Italia S.p.A., Milan (IT)

( * ) Notice: Subject to any disclaimer, the term of this patent is extended or adjusted under 35 U.S.C. 154(b) by 392 days.

(21) Appl. No.: 12/810,754

(22) PCT Filed: Dec. 27, 2007

(86) PCT No.: PCT/EP2007/064580
§ 371 (c)(1),
(2), (4) Date: Jun. 25, 2010

(87) PCT Pub. No.: WO2009/083028
PCT Pub. Date: Jul. 9, 2009

(65) Prior Publication Data

US 2010/0285772 A1 Nov. 11, 2010

(51) Int. Cl.
*H04M 11/00* (2006.01)

(52) U.S. Cl.
USPC ..................... 455/405; 455/456.1; 455/456.2; 455/456.3; 455/456.4; 455/456.5; 455/456.6

(58) Field of Classification Search
USPC .................. 455/435.1, 436–444, 432.1, 405, 455/456.1–456.6
See application file for complete search history.

(56) References Cited

U.S. PATENT DOCUMENTS

| | | | | |
|---|---|---|---|---|
| 5,465,289 | A | 11/1995 | Kennedy, Jr. | |
| 5,732,383 | A * | 3/1998 | Foladare et al. | 455/456.5 |
| 6,810,321 | B1 * | 10/2004 | Cook | 701/117 |
| 2004/0243298 | A1 * | 12/2004 | Knuuttila et al. | 701/117 |
| 2006/0106622 | A1 * | 5/2006 | Lee | 705/1 |

FOREIGN PATENT DOCUMENTS

| | | | |
|---|---|---|---|
| DE | 19638798 | A1 | 3/1998 |
| DE | 10225033 | A1 | 12/2003 |
| EP | 0763807 | A1 | 3/1997 |
| EP | 1501321 | A1 | 1/2005 |

OTHER PUBLICATIONS

International Search Report dtd Jun. 25, 2008, PCT/EP2007/064580.
CN Office Action mailed May 21, 2012, CN Appln. 200780102276.9, English translation.

* cited by examiner

*Primary Examiner* — Xiang Zhang
*Assistant Examiner* — Edward Zhang
(74) *Attorney, Agent, or Firm* — Banner & Witcoff, Ltd.

(57) ABSTRACT

A method of estimating traffic jams on a roads network includes receiving information from at least one cellular PLMN covering a geographic region wherein at least one road of the roads network to be monitored is located. The information includes data related to call traffic handled by the cellular PLMN in an at least one area of the geographic region, and an indication related to a mobility of mobile terminals into/out of the area. The method may further include providing an indication of traffic jam in the at least one road in case the call traffic handled by the cellular PLMN in the at least one area exceeds a first threshold and the indication related to the mobility of mobile terminals into/out of the area trespasses a second threshold.

14 Claims, 9 Drawing Sheets

| Tstart | Tstop | S_C_Id | D_C_Id | HO# | D_C_Id | HO# | | | D_C_Id | HO# |
|---|---|---|---|---|---|---|---|---|---|---|
| T0 | T0+ΔT | c0 | c1 | N0_01 | c2 | N0_02 | | | ck | N0_0k |
| T0+ΔT | T0+2*ΔT | c0 | c1 | N1_01 | c2 | N1_02 | | | ck | N1_0k |
| | | | | | | | | | | |
| | | | | | | | | | | |
| | | | | | | | | | | |
| T0+n*ΔT | T0+(n+1)*ΔT | c0 | c1 | Nn_01 | c2 | Nn_02 | | | ck | Nn_0k |
| | | | | | | | | | | |
| T0 | T0+ΔT | ci | c1 | N0_i1 | c2 | N0_i2 | | | ck | N0_ik |
| T0+ΔT | T0+2*ΔT | ci | c1 | N1_i1 | c2 | N1_i2 | | | ck | N1_ik |
| | | | | | | | | | | |
| | | | | | | | | | | |
| | | | | | | | | | | |
| T0+n*ΔT | T0+(n+1)*ΔT | ci | c1 | Nn_i1 | c2 | Nn_i2 | | | ck | Nn_ik |
| | | | | | | | | | | |

| S_C_Id | D_C_Id | HO_Thr | | | D_C_Id | HO_Thr |
|---|---|---|---|---|---|---|
| c0 | c1 | HO_Th_01 | | | cm | HO_Th_0m |
| | | | | | | |
| | | | | | | |
| ci | c0 | HO_Th_i0 | | | cm | HO_Th_im |
| | | | | | | |
| | | | | | | |
| cn | c0 | HO_Th_n0 | | | cm-1 | HO_Th_nm-1 |
| | | | | | | |

| Tstart | Tstop | C_Id | Tr_Val | C_Id | Tr_Val | | | C_Id | Tr_Val |
|---|---|---|---|---|---|---|---|---|---|
| T0 | T0+ΔT | c0 | V00 | c1 | V01 | | | c6 | V06 |
| T0+ΔT | T0+2*ΔT | c0 | V10 | c1 | V11 | | | c6 | V16 |
| | | | | | | | | | |
| | | | | | | | | | |
| | | | | | | | | | |
| T0+n*ΔT | T0+(n+1)*ΔT | c0 | Vn0 | c1 | Vn1 | | | c6 | Vn6 |
| | | | | | | | | | |

FIG. 3

| Tstart | Tstop | S_C_Id | D_C_Id | HO# | D_C_Id | HO# | | | D_C_Id | HO# |
|---|---|---|---|---|---|---|---|---|---|---|
| T0 | T0+ΔT | c0 | c1 | N0_01 | c2 | N0_02 | | | ck | N0_0k |
| T0+ΔT | T0+2*ΔT | c0 | c1 | N1_01 | c2 | N1_02 | | | ck | N1_0k |
| | | | | | | | | | | |
| | | | | | | | | | | |
| | | | | | | | | | | |
| T0+n*ΔT | T0+(n+1)*ΔT | c0 | c1 | Nn_01 | c2 | Nn_02 | | | ck | Nn_0k |
| | | | | | | | | | | |
| T0 | T0+ΔT | ci | c1 | N0_i1 | c2 | N0_i2 | | | ck | N0_ik |
| T0+ΔT | T0+2*ΔT | ci | c1 | N1_i1 | c2 | N1_i2 | | | ck | N1_ik |
| | | | | | | | | | | |
| | | | | | | | | | | |
| | | | | | | | | | | |
| T0+n*ΔT | T0+(n+1)*ΔT | ci | c1 | Nn_i1 | c2 | Nn_i2 | | | ck | Nn_ik |
| | | | | | | | | | | |

FIG. 4

| C_Id | Lat | Long | N_vrtx | Coord_1 | Coord_2 | | Coord_m |
|---|---|---|---|---|---|---|---|
| c0 | Lat_0 | Lon_0 | num_0 | (x10, y10) | (x20, y20) | | (xm0, ym0) |
| c1 | Lat_1 | Lon_1 | num_1 | (x11, y11) | (x21, y21) | | |
| | | | | | | | |
| | | | | | | | |
| ci | Lat_i | Lon_i | num_i | (x1i, y1i) | (x2i, y2i) | | (xmi, ymi) |
| | | | | | | | |
| cn | Lat_n | Lon_n | num_n | (x1n, y1n) | (x2n, y2n) | | (xmn, ymn) |

FIG. 5

| Rd_Id | Seg_Id | Start_Coord (xstart, ystart) | Stop_Coord (xstop, ystop) |
|---|---|---|---|
| Rd1 | Seg1 | xstart_11; ystart_11 | xstop_11; ystop_11 |
| | Seg2 | xstart_12; ystart_12 | xstop_12; ystop_12 |
| | Seg3 | xstart_13; ystart_13 | xstop_13; ystop_13 |
| | | | |
| Rdi | Seg1 | xstart_i1; ystart_i1 | xstop_i1; ystop_i1 |
| | Seg2 | xstart_i2; ystart_i2 | xstop_i2; ystop_i2 |
| | | | |
| Rdn | Seg1 | xstart_n1; ystart_n1 | xstop_n1; ystop_n1 |
| | Seg2 | xstart_n2; ystart_n2 | xstop_n2; ystop_n2 |

FIG. 6

| start | Tstop | C_Id | Tr_Val | C_Id | Tr_Val | | | C_Id | Tr_ Val |
|---|---|---|---|---|---|---|---|---|---|
| | T0'+ΔT | c0 | V00' | c1 | V01' | | | c6 | V06' |
| +ΔT | T0'+2*ΔT | c0 | V10' | c1 | V11' | | | c6 | V16' |
| | | | | | | | | | |
| | | | | | | | | | |
| | | | | | | | | | |
| +n*ΔT | T0'+(n+1)*ΔT | c0 | Vn0' | c1 | Vn1' | | | c6 | Vn6' |
| | | | | | | | | | |

FIG. 8

| Tstart | Tstop | S_C_Id | D_C_Id | HO# | D_C_Id | HO# | | | D_C_Id | HO# |
|---|---|---|---|---|---|---|---|---|---|---|
| T0' | T0'+ΔT | c0 | c1 | N0_01' | c2 | N0_02' | | | ck | N0_0k' |
| T0'+ΔT | T0'+2*ΔT | c0 | c1 | N1_01' | c2 | N1_02' | | | ck | N1_0k' |
| | | | | | | | | | | |
| | | | | | | | | | | |
| | | | | | | | | | | |
| T0'+n*ΔT | T0'+(n+1)*ΔT | c0 | c1 | Nn_01' | c2 | Nn_02' | | | ck | Nn_0k' |
| | | | | | | | | | | |
| T0' | T0'+ΔT | ci | c1 | N0_i1' | c2 | N0_i2' | | | ck | N0_ik' |
| T0'+ΔT | T0'+2*ΔT | ci | c1 | N1_i1' | c2 | N1_i2' | | | ck | N1_ik' |
| | | | | | | | | | | |
| | | | | | | | | | | |
| | | | | | | | | | | |
| T0'+n*ΔT | T0'+(n+1)*ΔT | ci | c1 | Nn_i1' | c2 | Nn_i2' | | | ck | Nn_ik' |
| | | | | | | | | | | |

FIG. 9

| C_Id | Tr_Thr |
|---|---|
| c0 | Traffic_Th_1 |
| c1 | Traffic_Th_2 |
| | |
| | |
| ci | Traffic_Th_i |
| | |
| cn | Traffic_Th_n |
| | |

| S_C_Id | D_C_Id | HO_Thr | | | D_C_Id | HO_Thr |
|---|---|---|---|---|---|---|
| c0 | c1 | HO_Th_01 | | | cm | HO_Th_0m |
| | | | | | | |
| | | | | | | |
| ci | c0 | HO_Th_i0 | | | cm | HO_Th_im |
| | | | | | | |
| | | | | | | |
| cn | c0 | HO_Th_n0 | | | cm-1 | HO_Th_nm-1 |
| | | | | | | |

| Rd_Id | Seg_Id | El_seg_Id | Start_Coord (xstart, ystart) | Stop_Coord (xstop, ystop) | C_Id | HO_C_Id |
|---|---|---|---|---|---|---|
| *Street1* | *Seg1* | | | | | |
| | *Seg2* | *Micro-Seg2_1* | *xstart_12_1; ystart_12_1* | *xstop_12_1; ystop_12_1* | *c1* | *c2* |
| | | *Micro-Seg2_2* | *xstart_12_2; ystart_12_2* | *xstop_12_2; ystop_12_2* | *c2* | *c3* |
| | | *Micro-Seg2_3* | *xstart_12_3; ystart_12_3* | *xstop_12_3; ystop_12_3* | *c3* | *c4* |
| | | *Micro-Seg2_4* | *xstart_12_4; ystart_12_4* | *xstop_12_1; ystop_12_4* | *c4* | *c5* |
| | | | | | | |
| *Streeti* | *Seg1* | | *xstart_i1; ystart_i1* | *xstop_i1; ystop_i1* | | |
| | *Seg2* | | *xstart_i2; ystart_i2* | *xstop_i2; ystop_i2* | | |
| | | | | | | |
| | | | | | | |
| | | | | | | |

FIG. 13

METHOD AND SYSTEM FOR DETERMINING ROAD TRAFFIC JAMS BASED ON INFORMATION DERIVED FROM A PLMN

CROSS REFERENCE TO RELATED APPLICATIONS

This is a U.S. National Phase Application under 35 U.S.C. §371 of International Application No. PCT/EP2007/064580 filed Dec. 27, 2010, which was published Under PCT Article 21(2), the entire contents of which are incorporated herein by reference.

BACKGROUND OF THE INVENTION

1. Field of the Invention

The present invention generally relates to methods and systems for estimating, monitoring and managing road traffic. More specifically, the present invention relates to a method and system for determining traffic jams based on information derived from a cellular Public Land Mobile telephony Network (PLMN).

2. Description of the Related Art

The estimation, monitoring and management of road traffic are normally accomplished based on a count of the number of vehicles that pass through one or more points of the monitored network of roads.

Vehicles counting methods are essentially of two types: manual counting methods and automatic counting methods.

Manual vehicles counting methods provide that operators, staying at the prescribed monitoring points along the roads, visually count the passing vehicles.

Automatic vehicles counting methods provide for placing, on or within the road floor, detectors adapted to detect the passage of the vehicles. Different types of detectors can be used, the more common being:

- rubber pipes closed at an end and connected to a membrane at the other end; the passage of a vehicle over the pipe creates a pressure thereinside that causes the membrane to flex, determining the increase of a vehicles counter;
- metal coils through which an electric current is made to flow that produces an electromagnetic field; the passage of a vehicle alters the electromagnetic field, and this event is detected causing the increase of a vehicles counter;
- television cameras connected to automatic image recognition systems adapted to count the number of transiting vehicles.

The manual counting of the passing vehicles, requiring the continuous presence of people at the road sections to be monitored, is used only for time-limited monitoring campaigns.

On the contrary, automatic vehicles counting methods are used for monitoring the road traffic for relatively long periods of time; however, the deployment of the detectors on the roads network and their connection to a central data processing server is very expensive, especially in medium and large urban areas, which are the scenarios where the road traffic monitoring, estimation and management is more useful.

A known alternative to the above-described vehicles counting methods makes use of a certain number of vehicles (called "floating cars") equipped with a GPS receiver which regularly transmit to a service center its position and speed, thereby allowing the service center to estimate the road traffic.

This method is as well very expensive, and its effectiveness is closely related to the number of circulating vehicles equipped with GPS receivers, i.e. to the number of floating cars; due to this, continuous monitoring of all the main roads of a certain area may not be possible.

In recent years, cellular PLMNs have also been used for the purposes of estimation, monitoring and management of the road traffic, thanks to the widespread presence of mobile phones among the population.

Systems that exploit cellular PLMNs for the estimation, monitoring and management of the road traffic varies according to the type of information on the position of the vehicles that they require for their operation.

For example, U.S. Pat. No. 5,465,289 discloses a system that makes use of sensors for monitoring communications going on in the cellular PLMN; number of calls placed, number of handovers performed, number of emergency calls are thus extracted, from which the system derives, based on a comparison of historical data, an estimation of the vehicles traffic, particularly the number of circulating vehicles and the number of accidents in a unit time.

In EP 763807 a method and system for detecting traffic jams are described; a traffic jam in a certain road section is assessed when the PLMN traffic in the network cell covering that road section exceeds a predetermined threshold. The method also allows determining the driving direction experiencing the traffic jam: assuming that the PLMN traffic threshold is exceeded firstly in a first network cell, and then in the adjacent, second network cell, located for example at the north of the first cell, it can be desumed that the driving direction experiencing the traffic jam is that directed from the north to the south.

SUMMARY OF THE INVENTION

The Applicant has observed that known methods and systems do not provide totally satisfactory results when the estimation of traffic jams is concerned.

In particular, concerning the solution disclosed in EP 763807, the Applicant has observed that, in practical cases, the two predetermined thresholds are not exceeded at the same time in the two cells, rather in the second cell the threshold is exceeded with a certain time delay compared to the first cell, because it is necessary to wait for the vehicles queue in the considered road section to reach the second cell. Such a delay is higher the wider the network cells, thus, particularly in extraurban areas (where the PLMN cells are usually wider compared to urban areas) it is difficult to quickly provide information about where a traffic jam exists.

The Applicant has tackled the problem of providing an efficient service of detection of traffic jams on roads of a roads network, useful in particular for vehicles drivers for avoiding to stay in queue.

In particular, the Applicant has tackled the problem of providing a service that is capable of determining the driving direction that may be affected by a traffic jam in a way that is not affected by the problems of known methods.

The Applicant has found that a solution to these and other problems may rely on the definition and use of two distinct thresholds: a first threshold related to the amount of call traffic successfully handled by a generic PLMN cell, and a second threshold related to the number of handovers successfully occurred between each PLMN cell towards any other cell adjacent thereto. The first threshold allows identifying the road section where a traffic jam is occurring, whereas the second threshold allows identifying the driving direction on that road section.

In particular, the present invention exploits counters that count the handled traffic handled by each cell of a generic BSC (Base Station Controller) or similar network apparatus of a cellular PLMN, and the number of handovers that took place between a generic cell and any other adjacent cell. The values of these counters are compared to predetermined thresholds, for example determined by considering the counter values over a sufficiently long time span, e.g. arithmetically averaging the counter values over a time interval that may include a predetermined number of days preceding the current time instant.

At the output, an indication of the road sections experiencing a traffic jam is provided, together with the driving direction that is affected by the traffic jam.

According to an aspect of the present invention, a method of estimating traffic jams on a roads network is provided, comprising:

receiving information from at least one cellular PLMN covering a geographic region wherein at least one road of the roads network to be monitored is located, wherein said information comprises data related to a call traffic handled by the cellular PLMN in an at least one area of said geographic region, and an indication related to a mobility of mobile terminals into/out of said area;

providing an indication of traffic jam in said at least one road in case said call traffic handled by the cellular PLMN in the at least one area exceeds a first threshold and the indication related to the mobility of mobile terminals into/out of said area trespasses a second threshold. Trespassing may mean either exceeding or falling below.

Said providing the indication of traffic jam may comprise:

comparing the call traffic handled by the cellular PLMN in the at least one area to the first threshold;

in case the call traffic handled by the cellular PLMN in the at least one area exceeds the first threshold, comparing the indication related to the mobility of mobile terminals into/out of said area to the second threshold; and providing the indication of traffic jam in at least one transit direction along said road in case the mobility of mobile terminals into/out of said area trespasses the second threshold.

The method may, further comprise calculating at least one among the first and second thresholds based on historical data related to the call traffic handled by the cellular PLMN and, respectively, to the indications related to the mobility of mobile terminals, particularly calculating averages of said historical data, and, possibly, determining standard deviations of a statistical distribution of said historical data.

Said at least one area may include at least one cell of the cellular PLMN, said data related to a call traffic handled by the cellular PLMN in the at least one area may include data related to a number of calls handled by said at least one cell, and said indication related to the mobility of mobile terminals into/out of said area may include data related to a number of handovers having the at least one cell as a source or as a destination.

Said at least one cell may include a first cell and a second cell adjacent to the first cell, and said providing an indication of traffic jam in said at least one road may include providing an indication of a driving direction on the road experiencing the traffic jam, said providing the indication of the driving direction may comprise:

indicating that the traffic jam is experienced in a first driving direction if the number of handovers from the first cell to the second cell trespasses the second threshold; and indicating that the traffic jam is experienced in a second driving direction if the number of handovers from the second cell to the first cell trespasses the second threshold.

The method may further comprise subdividing the at least one road into elementary road segments delimited by the boundary of the at least a first and a second cell, and providing traffic jam indications for the elementary road segments.

According to another aspect of the present invention, a system for estimating traffic jams on a roads network is provided, adapted to:

receive information from at least one cellular PLMN covering a geographic region wherein at least one road of the roads network to be monitored is located, wherein said information comprises data related to a call traffic handled by the cellular PLMN in an at least one area of said geographic region, and an indication related to a mobility of mobile terminals into/out of said area;

provide an indication of traffic jam in said at least one road in case said call traffic handled by the cellular PLMN in the at least one area exceeds a first threshold and the indication related to the mobility of mobile terminals into/out of said area trespasses a second threshold.

For providing the indication of traffic jam the system may be adapted to:

compare the call traffic handled by the cellular PLMN in the at least one area to the first threshold;

in case the call traffic handled by the cellular PLMN in the at least one area exceeds the first threshold, compare the indication related to the mobility of mobile terminals into/out of said area to the second threshold; and provide the indication of traffic jam in at least one transit direction along said road in case the mobility of mobile terminals into/out of said area trespasses the second threshold.

The system may also be adapted to calculate at least one among the first and second thresholds based on historical data related to the call traffic handled by the cellular PLMN and, respectively, to the indications related to the mobility of mobile terminals. Said calculate may comprise calculating averages of said historical data, and possibly determining standard deviations of a statistical distribution of said historical data.

Said at least one area may include at least one cell of the cellular PLMN, said data related to a call traffic handled by the cellular PLMN in the at least one area may include data related to a number of calls handled by said at least one cell, and said indication related to the mobility of mobile terminals into/out of said area may include data related to a number of handovers having the at least one cell as a source or as a destination.

Said at least one cell may include a first cell and a second cell adjacent to the first cell, and the system may be adapted to provide an indication of a driving direction on the road experiencing the traffic jam, said provide the indication of the driving direction comprising:

indicating that the traffic jam is experienced in a first driving direction if the number of handovers from the first cell to the second cell trespasses the second threshold; and indicating that the traffic jam is experienced in a second driving direction if the number of handovers from the second cell to the first cell trespasses the second threshold.

The system may be adapted to subdivide the at least one road into elementary road segments delimited by the boundary of the at least a first and a second cell, and to provide traffic jam indications for the elementary road segments.

BRIEF DESCRIPTION OF THE DRAWINGS

These and other features and advantages of the present invention will be made clear by the following detailed description of an embodiment thereof, provided merely by way of non-limitative example, made with reference to the attached drawings, wherein:

FIG. 3 shows, in tabular form, counters of the call traffic handled by PLMN cells under the responsibility of a BSC;

FIG. 4 shows, in tabular form, counters of handovers between the cells;

FIG. 5 shows, in tabular form, data identifying geographic areas covered by the different PLMN cells;

FIG. 6 shows, in tabular form, data geographically identifying the road sections;

FIG. 8 shows, in tabular form, data regarding the call traffic in the different PLMN cells, aggregated as a result of a step of the method of FIG. 7;

FIG. 9 shows, in tabular for, data regarding the number of handovers between the cells, aggregated as a result of a step of the method of FIG. 7;

FIG. 13 is a table of start and stop coordinates of the different road elements;

DETAILED DESCRIPTION OF PREFERRED EMBODIMENTS OF THE INVENTION

Figure 1:
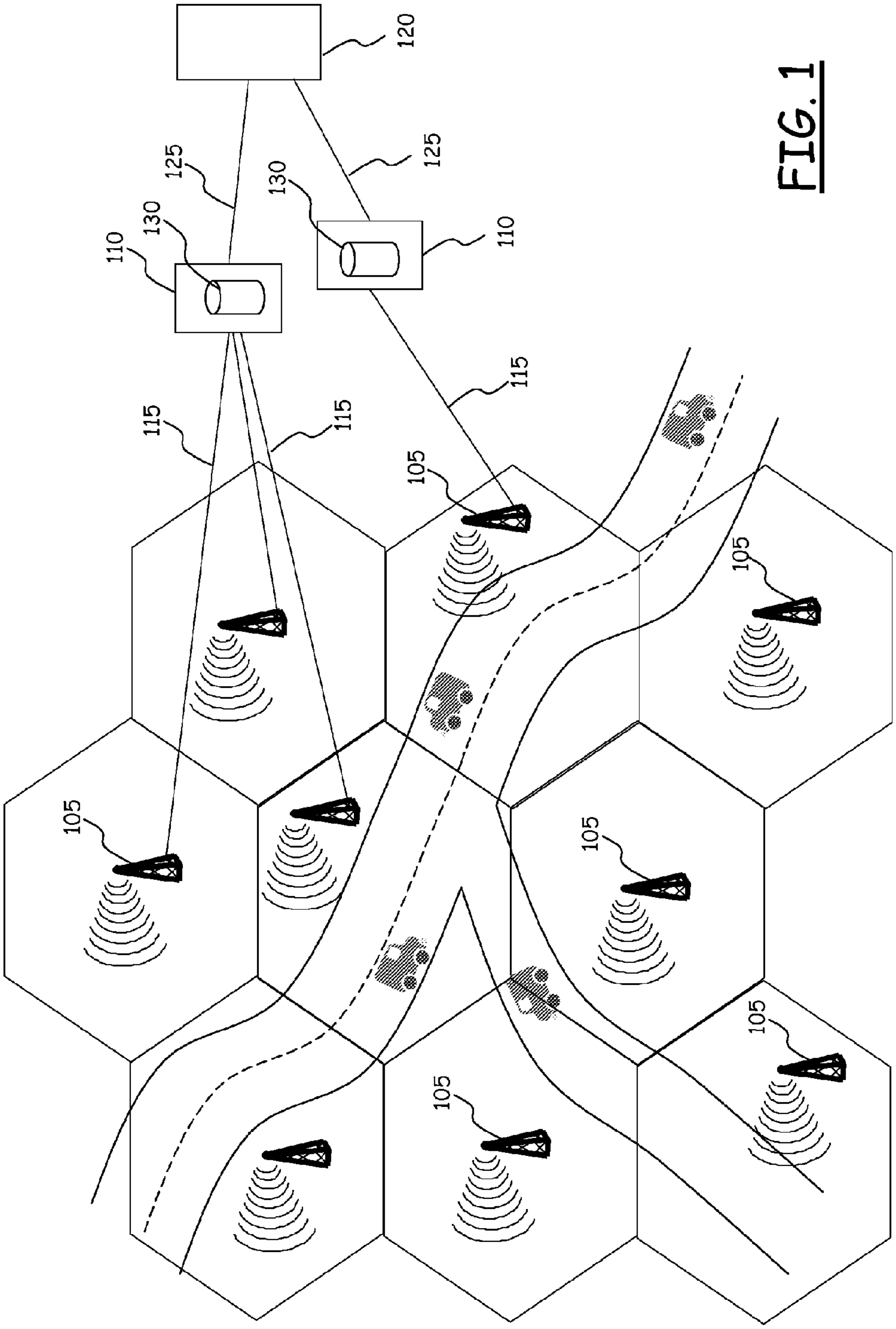
FIG. 1 synthetically shows a part of a monitored roads network, and a portion of a cellular PLMN covering the area where the considered part of the roads network is located.

Making reference to the drawings, in FIG. 1*a* part of a monitored roads network is schematically depicted. The drawing also schematically shows a portion of a cellular PLMN network that covers the geographic area where the considered part of roads network is located. Hereinafter, merely by way of example, it will be assumed that the cellular PLMN network is a GSM (Global System for Mobile communications) network, however it should be understood that the specific type of cellular PLMN is not limitative to the present invention, which also applies to other types of cellular PLMN networks, like for example UMTS (Universal Mobile Telecommunications System) network or other third-generation networks.

In the drawing, reference numeral 105 denotes Base Transceiver Stations (BTSs) of the cellular PLMN; each BTS 105 covers (being the "best server" therein) a geographic area, called a "cell", which in the drawing is for simplicity depicted as hexagonal in shape. It should be understood that, in practical applications, the PLMN cells generally do not have an hexagonal shape, and different cells have different area coverage (the shape and width of a generic cell depending on aspects like for example the BTS's transmission power and the morphology of the territory; for example, PLMN cells in urban area are typically smaller than PLMN in extraurban area).

The BTSs 105 handles the physical communication with the mobile terminals in the respective cells.

The BTSs 105 are connected to respective Base Station Controllers (BSCs) 110 through PLMN core network links 115, transporting the PLMN traffic (calls placed by mobile terminals located in the PLMN cells, SMS or MMS messages, data traffic in case the PLMN network is connected to a GPRS infrastructure, multicast-delivered contents) and signalling for the protocols that allow the proper operation of the cellular PLMN (like for example the signalling necessary for the handover procedures, which ensure the service continuity while the mobile terminals move across the territory, and the location update procedures, which allow the PLMN to keep track of the geographic macroarea (a geographic area corresponding to groups of network cells) where a generic mobile terminal is located).

The BSCs 110 manage the associated BTSs 105, routing the calls and managing the mobile terminals' mobility between different cells (i.e., the handovers).

The BSCs 110 are connected to respective Mobile Switching Centers (MSCs) 120, through links 125, which transport the PLMN traffic and signalling for core network protocols.

The MSCs 120 manage the associated BSCs 110 and manage the set-up of the calls and their routing through the network.

It is pointed out that, in case of PLMNs different from a GSM network, the Radio Access Network (RAN) structure, albeit similar, may be slightly different; for example, in the case of a UMTS network, the role of the BTSs is played by so-called "Node-Bs", which are connected to Radio Network Controllers (RNCs).

As schematically shown in the drawing, every BSC 110 has a local database 130 where counter values of several different counters are stored, which a PLMN operator may inspect to assess the network status. In particular, in the database 130 counter values of the handled call traffic, handled by the BTSs controlled by the BSC, and of the number of handovers involving the network cells managed by the BSC are stored.

Figure 2:
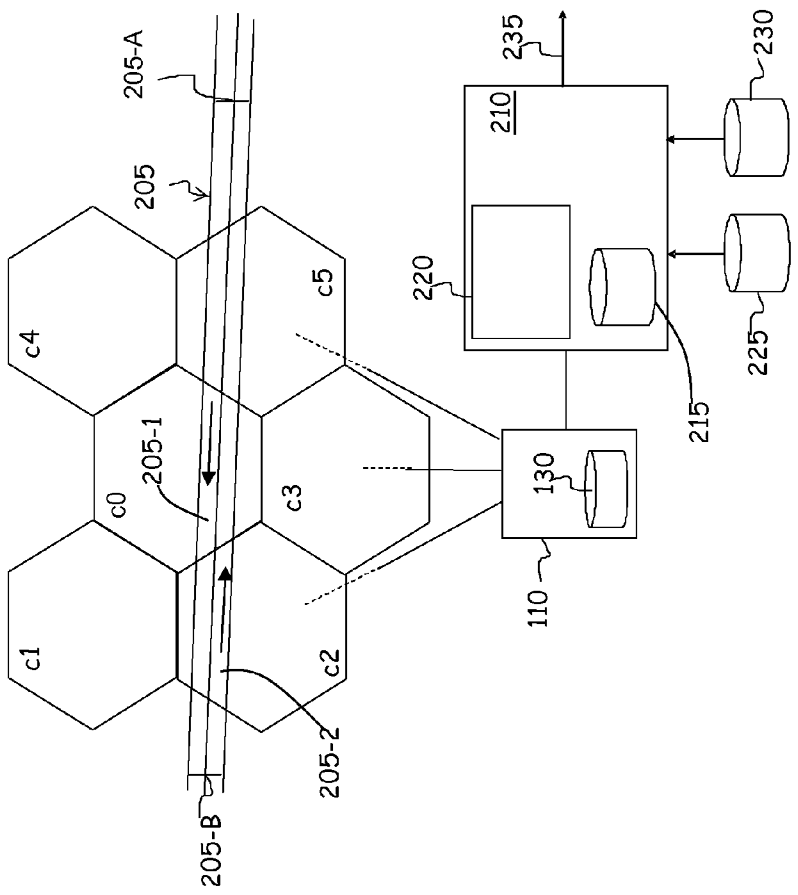
FIG. 2 schematically shows, in terms of functional blocks, a system according to an embodiment of the present invention for detecting traffic jams.

Referring to FIG. 2, there is schematically shown a road section 205 having two lanes 205-1 and 205-2 with opposite driving directions: from right to left in lane 205-1, and from left to right in lane 205-2. Also shown are cells c0 to c5 of a cellular PLMN, for example the PLMN of FIG. 1, and one BSC 110 managing the BTSs (not shown) of the cells c0 to c5, with the local database 130.

FIG. 3 schematically shows, in tabular form, a managed traffic counter of the generic BSC 110, stored in the local database 130. For every PLMN cell under the competence of that BSC, identified by the respective cell identifier (table columns labeled C_Id, one column for each cell; the cell identifiers of the cells c0 to c5 are assumed to be c0, c1, c2, c3, c4 and c5), a plurality of traffic count values is stored (table columns Tr_Val, one column for each cell), each count value representing the amount of call traffic (phone calls, messages, data traffic etc.) that the respective cell was able to handle in a respective time internal ΔT starting from a predetermined start time $T_0$ (in the table, the generic call traffic count value being denoted Vij, where the index i denotes the PLMN cell and the index j denotes the considered time interval).

FIG. 4 schematically shows, also in tabular form, a number of handovers counter of the generic BSC 110, stored in the local database 130. For every PLMN cell under the competence of that BSC, identified by the respective cell identifier (table columns labeled S_C_Id, one column for each cell; the cell identifiers of the cells c0 to c5 are assumed to be c0, c1, c2, c3, c4 and c5), the number of handovers (table columns HO#) occurring from the considered cell (regarded as the source cell) towards any adjacent cell (the destination cell, table columns D_C_Id) in the respective time internals $\Delta T$ starting from a predetermined start time $T_0$ are reported (in the table, the generic handover number is denoted Nh_ij, where the index h denotes the considered time interval, the index i denotes the source PLMN cell and the index j denotes the destination PLMN cell). The BSC handover number counter may further keep track of the number of handovers from one cell managed by that BSC to cells that are managed by different BSCs.

FIG. 2 also depicts schematically a system 210 according to an embodiment of the present invention for the detection of traffic jams on monitored roads. The system 210 is shown in terms of functional blocks, each of which can be implemented by means of software, hardware, or as a mix of hardware and software. Essentially, according to an embodiment of the present invention, the system 210 comprises a local database 215 and a processing and calculation engine 220. The system 210 is connected to the BSCs 110 of the PLMN network (or at least to those BSC managing BTSs that cover an area of interest, where the roads to be monitored are located). The system 210 has also access to a first external database 225 storing data relating to all the BTSs 105 that cover the area where the road sections to be monitored are located, and other data useful to the system 210. The system 210 has further access to a second external database 230 storing data related to the roads to be monitored.

The system 210 has an output 235 through which it provides to users (possibly comprising software applications) the indications about possible traffic jams.

FIG. 5 schematically shows, in tabular form, a possible structure of the first external database 225, in an embodiment of the present invention. Each row of the table corresponds to a different BTS, whereas in the table columns there are reported the unique identifier of the BTS (table column C_Id), its geographical position (table columns Lat and Long, standing for latitude and longitude), the number of vertexes of the generally irregular polygon defining the cell's borders (table column N_vrtx), and the vertexes' geographic coordinates (table columns Coord_1, Coord:2, . . . , Coor_m); the number of vertexes may and generally does vary from cell to cell.

FIG. 6 schematically shows, still in tabular form, a possible structure of the second external database 225, in an embodiment of the present invention. Each road to be monitored, identified by a respective road identifier (table column Rd_Id; the road identifiers are assumed to be Rd1, Rd2, . . . , Rdm) can be subdivided into two or more road sections or segments, each one identified by a respective road segment identifier (table column Seg_Id). Of each road, or segment of road, the respective start and stop geographic coordinates are provided (table columns Start_Coord (xstart, ystart) and Stop_Coord (xstop, ystop)). The sequence of start and stop coordinates determines the orientation, i.e. the driving direction, on that road/segment of road. For example, considering the road section 205 in FIG. 2, points 205-A and 205-B identify two segments 205-1 and 205-2, the first segment having the start coordinates corresponding to the coordinates of the point 205-A and the stop coordinates corresponding to the coordinates of the point 205-B, whereas the second segment has the start coordinates corresponding to the coordinates of the point 205-B and the stop coordinates corresponding to the coordinates of the point 205-A; thus, the driving direction is from point 205-A to point 205-B along the first road segment (205-1), whereas it is from the point 205-B to the point 205-A along the second road segment (205-2).

Hereinafter, the operation of the system 210 according to an embodiment of the present invention will be described.

It is convenient, at least from the description viewpoint, divide the system operation into two phases: a start phase, and a normal operation phase.

Figure 7:
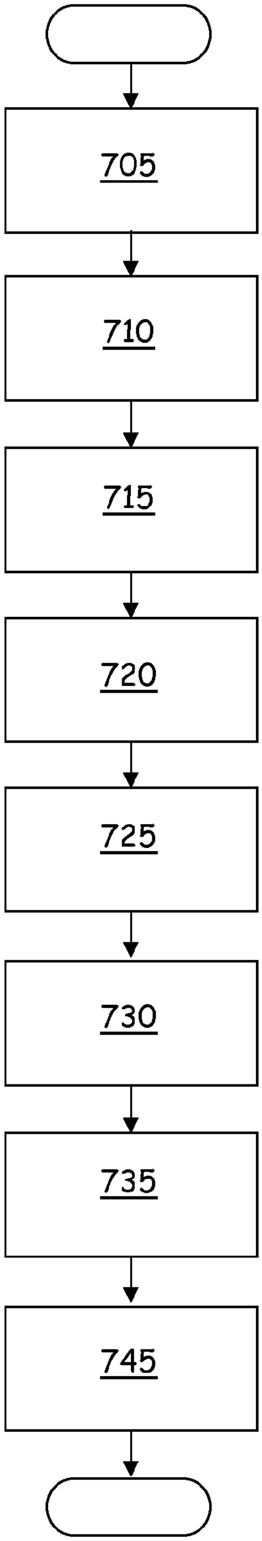
FIG. 7 is a schematic flowchart of a method according to an embodiment of the present invention for calculating call traffic and number of handovers thresholds, to be used for the detection of traffic jams.

Referring to the schematic flowchart of FIG. 7, in the start phase the system 210 performs, in an embodiment of the invention, the following operations.

Step 705—the system 210 reads the list of BTSs of the cellular PLMNs contained in the first external database 225.

Step 710—the system 210 reads, from the second external database 230, the list of roads (and respective road segments) to be monitored.

Step 715—the system 210 reads, from the local databases 130 of the BSCs of interest, the counter values of the traffic handled by the respective network cells in a predefined time range, defined for example by a system administrator, and stores the read values in its database 215.

Step 720—the system 210 reads, from the local databases 130 of the BSCs of interest, the number of handovers in which the respective network cells have been involved, in the predefined time range, and stores the read values in its database 215.

Step 725—The system 210 calculates, for every BTS covering the area of interest, respective handled traffic thresholds.

Step 730—The system 210 calculates, for every BTS of the area of interest, respective handover number thresholds for the handovers from any cell towards any other adjacent cell.

Step 735—the system 210 subdivides the roads or road segments into elementary road segments, based on the area coverage by the different BTSs.

Step 740—the system identifies the PLMN cell towards which a handover is performed when moving from one elementary road segment to the successive one.

FIG. 8 schematically shows, in tabular form, the content of the section of the system database 215 devoted to store handled call traffic counters after step 720. The start instant T0' of the monitoring time range does not in general coincide with the start instant T0 starting from which the BSCs stores, in their local databases 130, the call traffic counter values—the instant T0 may be the time instant at which the BSC is turned on, or a subsequent time instant, from which the BSC starts updating the traffic local database after having filled it. The time instant T0' may instead be the current time minus the monitoring time range (usually of the order of some months) set for example by the system administrator. The values reported in the table have the same meaning as those reported in the table of FIG. 5.

FIG. 9 schematically shows, in tabular form, the content of the section of the system database 215 devoted to store handovers number counters after step 725. The values reported in the table have the same meaning as those reported in the table of FIG. 6.

Figures 10, 11, 12:
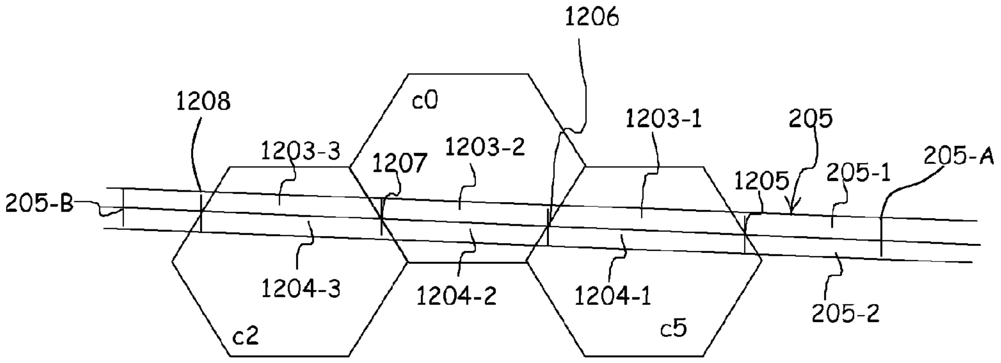
FIG. 10 shows, in tabular form, handled traffic threshold values calculated as a result of a step of the method of FIG. 7.
FIG. 11 shows, in tabular form, number of handovers thresholds calculated as a result of a step of the method of FIG. 7.
FIG. 12 exemplifies a way road sections are subdivided into elements covered by single cells.

FIG. 10 schematically shows a table built as a result of step 725, in which, for every BTS (i.e., for every PLMN cell), identified by the respective cell identifier, a respective handled traffic threshold Tr_Tsch is stored, calculated for example by averaging the handled traffic counter values, stored in the BTS local database, in the time range of interest, set for example by the system administrator; alternatively, for every BTS, two or more handled traffic thresholds can be calculated, each one related to a specific time interval ΔT (for example, a specific time of the day, e.g. morning, afternoon, evening, night), calculated by averaging all the values of traffic handled by the BTS in the considered time range and in the specific time interval ΔT.

FIG. 11 schematically shows a table built as a result of step 730, in which, for every BTS (identified by the respective cell identifier) regarded as a source cell in a handover, all the possible destination BTSs (adjacent cells) are listed (i.e., those BTS towards which a handover originating from the source BTS occurred), together with the corresponding thresholds of number of successful handovers. Also in this case, the thresholds can be calculated averaging all the handover values from the considered source BTS to the generic destination BTSs in the considered time range.

In step 735, every elementary road segment has two ends that coincide with the points at which the roads or road segments to which the elementary road segment belongs intersects PLMN cells. For example, making reference to FIG. 12, along the road segment 205-1 three elementary road segments 1203-1, 1203-2 and 1203-3 are defined, whereas on the road segment 205-2 three road segments 1204-1, 1204-2 and 1204-3 are defined. The points that delimit the elementary road segments are the points 1205, 1206, 1207 and 1208, i.e. the points of intersection between the road segments 205-1 and 205-2 and the PLMN cells c0, c2 and c5. The elementary road segments, similarly to the roads/road segments, have an orientation, thus, considering for example the elementary road segment 1203-1, the start coordinates thereof coincide with those of the point 1205, whereas the stop coordinates of the elementary road segment 1203-1 are those of the point 1206. The result of this step is schematically depicted in FIG. 13, where a table is shown in which, for every road and road segment, the constituent elementary road segments are listed, identified by an elementary road segment identifier (table column El_seg_Id), together with the respective start and stop coordinates, and the identifier of the PLMN cell in whose coverage area the elementary road segment is located. In case of roads having two driving directions, two elementary segments of that road can be located in a same cell. In case of neighboring roads, like those converging towards a road crossing, a higher number of elementary road segments may be located in a same cell.

In step 740, the system 210 identifies the PLMN cell towards which a mobile terminal makes a handover when exiting a certain elementary road segment to enter the successive elementary road segment (having as start coordinates the stop coordinates of the preceding elementary road segment). Such a PLMN cell may or may not coincide with the cell covering the elementary road segment being exited. For example, referring to FIG. 12, and considering the elementary road segment 1203-2, the cell towards which handover is made is the cell c2, whereas for the elementary road segment 1204-2 the cell towards which handover is made is the cell c5. The table shown in FIG. 13 is built as a result of step 740. The identifier of the cell towards which handover is made is inserted in the table column HO_C_Id. In case of a road having two driving directions, or in the case of crossing roads, the indication of the cell towards which the handover is made will allow identifying the specific elementary road segment where a traffic jam occurred, as described in the following.

Figure 14:
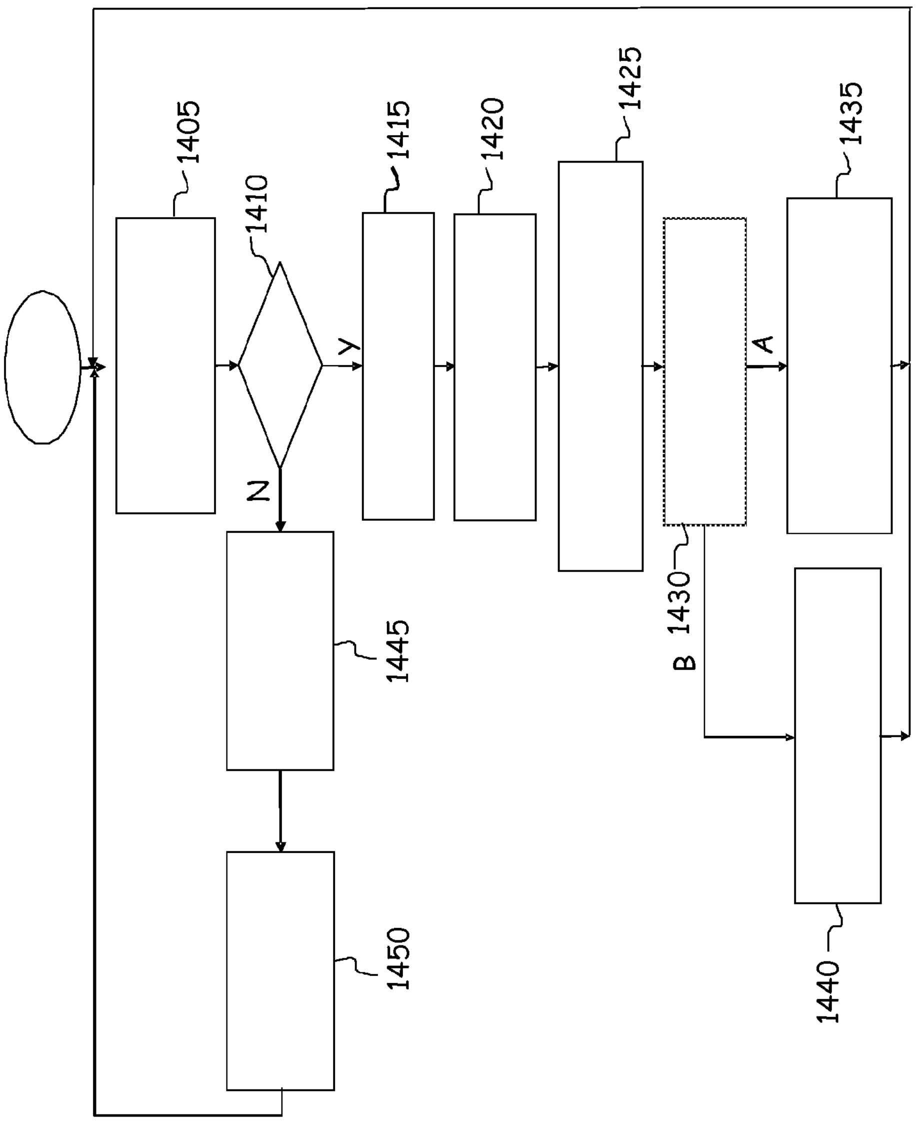
FIG. 14 is a schematic flowchart of a method according to an embodiment of the present invention for detecting traffic jams.

After the start phase, the system 210 enters a normal operation phase, which is schematized by the flowchart of FIG. 14. Essentially, at the end of every time interval ΔT0, the system 210, particularly the processing engine 215, performs, for every PLMN cell, the following operations:

Step 1405—the system 210 inquiries the local database 130 of the BSC competent for the generic cell ci under consideration, and reads the value of the handled traffic counter TSi for that cell.

Step 1410—The system 210 compares the read handled traffic counter value TSi with the traffic threshold value Traffic_Th_i calculated for that cell ci; at the first run, the threshold value is that calculated in the start phase, as described above, and stored in the table of FIG. 10, whereas in subsequent runs the threshold value is that calculated in the preceding run (as described later—step 1450).

Step 1415—In case the read value TSi exceeds the threshold Traffic_Th_i, (exit branch Y in the flowchart), the system 210 selects, from the table shown in FIG. 13, all the elementary road segments covered by the cell ci.

Step 1420—For all the elementary road segments thus selected, the system 210 identifies the respective cells cj destination of a handover.

Step 1425—The system 210 reads, from the BSC local database, the value of the number of successful handovers HOij from the cell ci towards all the cells cj identified at the preceding step.

Step 1430—The system 210 compares the number of successful handovers values HOij with the handover number threshold values HO_Th_ij calculated, for the first run, in the start phase, as described above, or, in each subsequent run, at the preceding run, and stored in the table of FIG. 11.

In case for one or more of the possible handover destination cells, for example for the destination cell cj, the number of successful handovers from the source cell ci to the destination cell cj is lower than the respective threshold HO_Th_ij (exit branch A in the flowchart), the system provides in output an indication of a traffic jam in the elementary road segment covered by the cell ci and having as handover destination cell the cell cj (step 1435).

In case for all the cells cj being a possible destination of handovers from the origin cell ci the number of successful handovers from the cell ci to the handover destination cells is higher than the respective thresholds (exit branch B in the flowchart), the system 210 provides in output the indication of traffic jam on all the elementary road segments covered by the cell ci, without providing an indication of the directions along which the traffic jam is experienced (step 1440).

Step 1445—In case at step 1410 the system 210 assesses that the value TSi is lower than the threshold Traffic_Th_i (exit branch N in the flowchart), the system 210 reads from the local database of the BSC the values of handled traffic and successful handovers for the cell ci not read at the preceding time interval, and stores them in the local database 215, updating the tables in FIGS. 8 and 9.

Step 1450—The system recalculates the thresholds of handled traffic and handover number for the cell ci, and updates the tables of FIGS. 10 and 11.

This sequence of operations is repeated at the end of each time interval ΔT0.

The system according to the herein described embodiment of the invention can be implemented by means of any data processing system and with any operating system (Windows, Linux, Unix, MAC OS). The computer programs for implementing the system of the present invention can be written in any programming language, such as the Ansi C++, which exhibits good programming flexibility and guarantees high performance levels in terms of processing speed; other programming languages can however be exploited, like Java, Delphi, Visual Basic. The choice of the language Ansi C++ is dictated by the.

As pointed out in the foregoing, the present invention is not limited to any specific PLMN network, which can for example be a second-generation (2G) network or a 3G network.

An advantage of the present invention is that no changes to the protocols of the cellular PLMN are required, nor changes to the hardware or the software of the mobile terminals.

The system of the present invention may communicate with the cellular PLMN apparatuses (e.g., the BSCs) by means of any communication technology, which can for example be by wired or wireless or optical, exploiting point-to-point or point-to-multipoint connections.

The system may also receive data from two or more cellular PLMNs, run by a same or by different operators, exploiting similar or different network apparatuses.

The system of the present invention may have a centralized or a distributed architecture (for example, one system may be associated with every BSC), the choice depending for example on the number of roads to be monitored, on the transmission capacity of the communication links between the system and the PLMN apparatuses, the storage capacity of the system database and the processing power of the processing engine.

The way in which the coverage of a geographic area by the PLMN is calculated is not limitative for the present invention. For example, the PLMN area coverage may be provided by a PLMN planning tool, of the type used by PLMN operators to plan PLMNs, or it can be obtained using an ad-hoc tool, based for example on geometrical criteria, considering for example a generic PLMN cell as the set of territory points close to a certain BTS.

The way in which handled call traffic thresholds and handover numbers thresholds are calculated is not limitative for the present invention; for example, as an alternative to what described in the foregoing, the threshold may be calculated based on statistical parameters like the standard deviation, or a multiple thereof, of all the counter values in the time range of interest. The threshold could also be differentiated based on the time zone of the day (morning, afternoon, evening, night), on the day of the week, on the period of the year (season).

The time range in which the thresholds are calculated may be fixed or variable, for example based on the hour of the day, of the month, of the traffic load of the PLMN (number of users connected, handled traffic), based on the degree of confidence of the output that the system administrator wishes, based on the price the final user is available to pay for enjoying the service, and the like.

The method and system of the present invention may also exploit other types of counters among those held by the network apparatuses, like the BSCs, for example the counter of net number of successful handovers in each cell (given by the difference between the outgoing handovers and the ingoing handovers), the counter of the number of "Location Updates" (the results of the GSM network procedures that allow the network gaining knowledge of the macroarea where the mobile terminals are located, which correspond to the "Routing Area Update" procedures of UMTS networks) in entrance/exit/net related to a macroarea, the counter of the number of "Routing Area Updates" in entrance/exit/net related to a macroarea, the counter of the number of unsuccessful calls originated by the mobile terminals, and the like. These counters may also be combined together: for example, it may be possible to consider the sum of number of handovers in entrance to a cell and of the number of handovers in exit from that cell to any other cell). In general, the indication of traffic jam may be given in case the calculated threshold is trespassed, and, depending on the specific counter used, the threshold trespassing may correspond to exceeding the threshold or falling below it.

More generally, the present invention has been here described presenting some possible embodiments thereof, but those skilled in the art will readily appreciate that several modifications to the described embodiments are possible, as well as other possible embodiments, which do not depart from the scope of the protection as defined in the appended claims.

The invention claimed is:

1. A method of estimating traffic jams on a roads network, comprising:

receiving information from at least one cellular network covering a geographic region wherein at least one road of the roads network to be monitored is located, wherein said information comprises data related to call traffic handled by the cellular network in an at least one area of said geographic region, and an indication related to mobility of mobile terminals into/out of said area;

providing an indication of traffic jam in said at least one road in a case that said call traffic handled by the cellular network in the at least one area exceeds a first threshold and the indication related to the mobility of mobile terminals into/out of said area trespasses a second threshold, wherein said providing the indication of traffic jam comprises:

comparing the call traffic handled by the cellular network in the at least one area to the first threshold;

in a case that the call traffic handled by the cellular network in the at least one area exceeds the first threshold, comparing the indication related to the mobility of mobile terminals into/out of said area to the second threshold; and providing the indication of traffic jam in at least one transit direction along said road in a case that the mobility of mobile terminals into/out of said area trespasses the second threshold; and calculating at least one among the first and second thresholds based on historical data related to the call traffic handled by the cellular network and, respectively, to the indications related to the mobility of mobile terminals, wherein the calculating comprises calculating averages of the historical data.

2. A method of estimating traffic jams on a roads network, comprising:

receiving information from at least one cellular network covering a geographic region wherein at least one road of the roads network to be monitored is located, wherein said information comprises data related to call traffic handled by the cellular network in an at least one area of said geographic region, and an indication related to mobility of mobile terminals into/out of said area;

providing an indication of traffic jam in said at least one road in a case that said call traffic handled by the cellular network in the at least one area exceeds a first threshold and the indication related to the mobility of mobile terminals into/out of said area trespasses a second threshold; and calculating at least one of the first and second thresholds based on historical data related to the call traffic handled by the cellular network, wherein said calculating comprises determining standard deviations of a statistical distribution of said historical data.

3. The method of claim 1, wherein said at least one area includes at least one cell of the cellular network, said data related to call traffic handled by the cellular network in the at least one area include data related to a number of calls handled by said at least one cell, and said indication related to the mobility of mobile terminals into/out of said area include data related to a number of handovers having the at least one cell as a source or as a destination.

4. The method of claim 3, wherein said at least one cell includes a first cell and a second cell adjacent to the first cell, and wherein said providing the indication of traffic jam in said at least one road includes providing an indication of a driving direction on the road experiencing the traffic jam, said providing the indication of the driving direction comprising:

indicating that the traffic jam exists in a first driving direction if the number of handovers from the first cell to the second cell trespasses the second threshold; and indicating that the traffic jam exists in a second driving direction if the number of handovers from the second cell to the first cell trespasses the second threshold.

5. The method of claim 4, further comprising subdividing the at least one road into elementary road segments delimited by the boundary of at least the first cell and the second cell, and providing traffic jam indications for the elementary road segments.

6. A computer system for estimating traffic jams on a roads network, configured to:

receive information from at least one cellular network covering a geographic region wherein at least one road of the roads network to be monitored is located, wherein said information comprises data related to call traffic handled by the cellular network in an at least one area of said geographic region, and an indication related to mobility of mobile terminals into/out of said area;

provide an indication of traffic jam in said at least one road in a case that said call traffic handled by the cellular network in the at least one area exceeds a first threshold and the indication related to the mobility of mobile terminals into/out of said area trespasses a second threshold, wherein for providing the indication of traffic jam the system is configured to:

compare the call traffic handled by the cellular network in the at least one area to the first threshold;

in a case that the call traffic handled by the cellular network in the at least one area exceeds the first threshold, compare the indication related to the mobility of mobile terminals into/out of said area to the second threshold; and provide the indication of traffic jam in at least one transit direction along said road in a case that the mobility of mobile terminals into/out of said area trespasses the second threshold; and calculate at least one among the first and second thresholds based on historical data related to the call traffic handled by the cellular network and, respectively, to the indications related to the mobility of mobile terminals, wherein the calculate comprises calculating averages of the historical data.

7. The system of claim 6, wherein said calculate comprises determining standard deviations of a statistical distribution of said historical data.

8. The system of claim 6, wherein said at least one area includes at least one cell of the cellular network, said data related to call traffic handled by the cellular network in the at least one area include data related to a number of calls handled by said at least one cell, and said indication related to the mobility of mobile terminals into/out of said area include data related to a number of handovers having the at least one cell as a source or as a destination.

9. The system of claim 8, wherein said at least one cell includes a first cell and a second cell adjacent to the first cell, and wherein the system is configured to provide an indication of a driving direction on the road experiencing the traffic jam, said provide the indication of the driving direction comprising:

indicating that the traffic jam exists in a first driving direction if the number of handovers from the first cell to the second cell trespasses the second threshold; and indicating that the traffic jam exists in a second driving direction if the number of handovers from the second cell to the first cell trespasses the second threshold.

10. The system of claim 9, configured to subdivide the at least one road into elementary road segments delimited by the boundary of at least the first cell and the second cell, and to provide traffic jam indications for the elementary road segments.

11. The method of claim 2, wherein said providing the indication of traffic jam comprises:

comparing the call traffic handled by the cellular network in the at least one area to the first threshold;

in a case that the call traffic handled by the cellular network in the at least one area exceeds the first threshold, comparing the indication related to the mobility of mobile terminals into/out of said area to the second threshold; and providing the indication of traffic jam in at least one transit direction along said road in a case that the mobility of mobile terminals into/out of said area trespasses the second threshold.

12. The method of claim 2, wherein said at least one area includes at least one cell of the cellular network, said data related to call traffic handled by the cellular network in the at least one area include data related to a number of calls handled by said at least one cell, and said indication related to the mobility of mobile terminals into/out of said area include data related to a number of handovers having the at least one cell as a source or as a destination.

13. The method of claim 12, wherein said at least one cell includes a first cell and a second cell adjacent to the first cell, and wherein said providing the indication of traffic jam in said at least one road includes providing an indication of a driving direction on the road experiencing the traffic jam, said providing the indication of the driving direction comprising:

indicating that the traffic jam exists in a first driving direction if the number of handovers from the first cell to the second cell trespasses the second threshold; and indicating that the traffic jam exists in a second driving direction if the number of handovers from the second cell to the first cell trespasses the second threshold.

14. The method of claim 13, further comprising subdividing the at least one road into elementary road segments delimited by the boundary of at least the first cell and the second cell, and providing traffic jam indications for the elementary road segments.

* * * * *

UNITED STATES PATENT AND TRADEMARK OFFICE

CERTIFICATE OF CORRECTION

PATENT NO. : 8,538,377 B2
APPLICATION NO. : 12/810754
DATED : September 17, 2013
INVENTOR(S) : Colonna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this
Fifteenth Day of September, 2015

Michelle K. Lee
*Director of the United States Patent and Trademark Office*